United States Patent [19]

Suzuki

[11] Patent Number: 4,730,303
[45] Date of Patent: Mar. 8, 1988

[54] DIGITAL SWITCHING SYSTEM WITH HOST AND REMOTE DUPLICATED TRANSMISSION CONTROLLERS

[75] Inventor: Yoshihiko Suzuki, Tokyo, Japan

[73] Assignee: NEC Corporation, Japan

[21] Appl. No.: 877,246

[22] Filed: Jun. 23, 1986

[30] Foreign Application Priority Data

Jun. 24, 1985 [JP] Japan .................. 60-137441

[51] Int. Cl.⁴ ........................... H04Q 11/04
[52] U.S. Cl. ........................... 370/58; 370/60
[58] Field of Search ................ 370/53, 58, 60

[56] References Cited

U.S. PATENT DOCUMENTS 4,615,028  9/1986  Lewis ................ 370/58
4,653,047  3/1987  Vij ................... 370/58

OTHER PUBLICATIONS

NEAX 61 Digital Remote Switching System (UDC 621.395, pp. 86–93), by: Akihiro Kitamura et al, NEC Research and Development, No. 64, Jan. 82.

Primary Examiner—Michael A. Masinick
Attorney, Agent, or Firm—Laff, Whitesel, Conte & Saret

[57] ABSTRACT

A digital switching system for smooth transfer between active and standby mode of duplicated transmission controllers at a host office (host digital trunk interface controllers) and duplicated transmission controllers at a remote office (remote local controllers).

1 Claim, 3 Drawing Figures

DIGITAL SWITCHING SYSTEM WITH HOST AND REMOTE DUPLICATED TRANSMISSION CONTROLLERS

BACKGROUND OF THE INVENTION

This invention relates to a digital switching system and, more particularly, to a digital switching system with host and remote duplicated transmission controllers.

Since faults in switching systems cause serious inconveniences in a social file, system component devices cannot be suspended under any circumstances. It is, therefore, necessary to construct the system with both active devices and standby devices or in "ACT/STBY" structure to allow redundancy. Transmission lines should also be made redundant in order to maintain reliability if they connect switching offices over a long distance and in a severe environment.

An example of measures to meet such requirements in the digital switching system is disclosed in the "NEAX 61 Digital Remote Switching System" (NEC RESEARCH & DEVELOPMENT No. 64, pp. 86–93, published in January, 1982 by NEC Corporation. In the switching system described, host digital trunk interface controllers (HDTIC's) at a host office and remote local controllers (RLOC's) at a remote office are duplicated respectively by "ACT/STBY" redundancy structure. A plurality of digital transmission lines of a redundancy structure are provided between the duplicated HDTIC's ($HDTIC_0$ and $HDTIC_1$) and the duplicated RLOC's ($RLOC_0$ and $RLOC_1$) The HDTIC's and the RLOC's communicate with each other generally through one transmission line, but if a fault occurs in the transmission line, another transmission line must be selected and used for the communication. By utilizing this type of structure, even if faults occur in transmission lines, suspension of communication service can be avoided. Since only the $HDTIC_0$ and the $RLOC_0$ which are currently in active mode among the duplicated HDTIC's and RLOC's have the control over the transmission lines, or the right to select one of the transmission lines, and to transmit data, the $HDTIC_1$ and the $RLOC_1$ which are currently in standby mode are operated by monitoring the control information transmitted via the selected transmission line. When a fault occurs in the switching system which requires switching between active and standly modes, the $HDTIC_1$ and the $RLOC_1$ which have been in standby mode are often affected by the $HDTIC_0$ and the $RLOC_0$ to thereby become unable to continue smooth communication service. Further, as the $HDTIC_1$ and the $RLOC_1$ are in inactive state, and when they are to be switched to active state, they must copy the operative state on the $HDTIC_0$ and the $RLOC_0$ by mate communication, communication service in such a separate mode is unavoidably suspended while the state is being copied.

SUMMARY OF THE INVENTION

Accordingly, an object of the present invention is to provide a digital switching system which is capable of smoothly transferring between active mode and standby mode of duplicated transmission controllers at a host office (host digital trunk interface controllers) and duplicated transmission controllers at a remote office (remote local controllers).

Another object of the invention is to provide a digital switching system wherein transmission controllers at both a host office and a remote office can continue operation with high reliability when they are newly selected to be active by active-standby switching at the time of faults disregarding faults occurring on the transmission controllers which have been in active mode.

Still another object of the invention is to provide a digital switching system wherein active transmission controllers and standby transmission controllers at a host office and a remote office can independently and separately deal with errors in the transmission of control information.

According to one aspect of the invention, there is provided a digital switching system which includes a host office having duplicated first and second transmission controllers each of which operates in one of active and standby modes alternatively. The system includes a remote office having duplicated third and fourth transmission controllers which are connected to the first and second transmission controllers via at least two of time division multiplexed digital transmission lines and each of which operates in one of active and standby modes alternatively. The first transmission controller and the second transmission controller are connected to each other via cross-communication lines through which control information is transmitted/received therebetween. The third transmission controller and the fourth transmission controller are connected via cross-communication lines through which control information is transmitted/received therebetween. The first and third transmission controllers and the second and fourth transmission controllers transmit/receive the control information via different channels of one of the transmission lines in accordance with a high level data link control (HDLC) protocol. The controllers which operate currently in active mode supply respectively their own time division multiplexed paths to the controllers which operate currently in standby mode.

BRIEF DESCRIPTION OF THE DRAWINGS

The above and other objects, features and advantages of the present invention may be fully understood from the following detailed description and the accompanying drawings, wherein.

In the drawings, identical reference numerals denote identical structure elements.

DESCRIPTION OF THE PREFERRED EMBODIMENT

Figure 1:
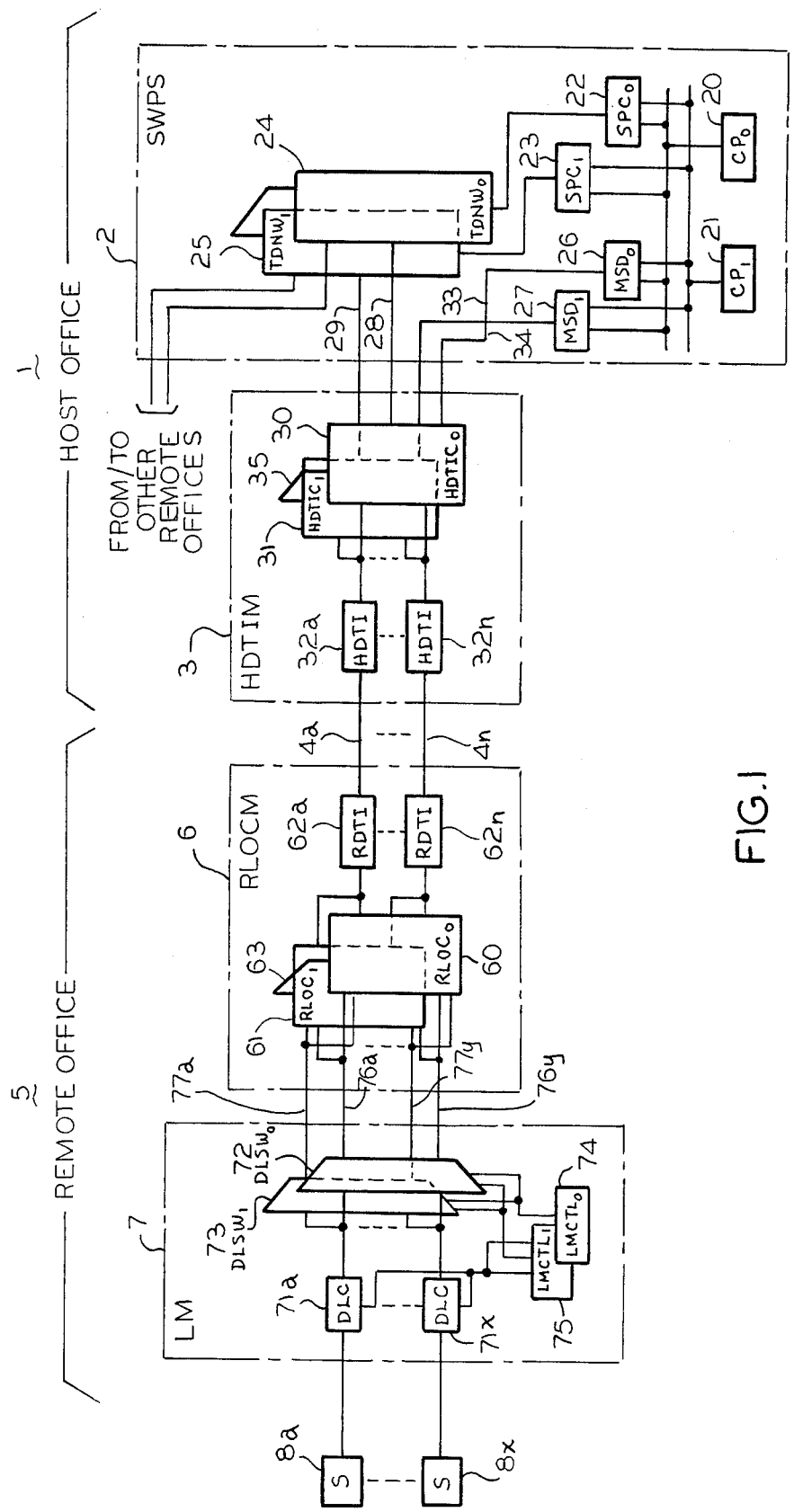
FIG. 1 is a block diagram of an embodiment of the invention.

Referring now to FIG. 1 which depicts an embodiment of this invention system, a host office 1 is a central switching station which is generally installed in an urban area and which comprises a switching and processor sub-system (SWPS) 2 and a host digital trunk interface module (HDTIM) 3. The SWPS2 is a higher order device than the HDTIM3 and incorporates call processors ($CP_0$ and $CP_1$) 20 and 21, speech path controllers ($SPC_0$ and $SPC_1$) 22 and 23, time division switching networks ($TDNW_0$ and $TDNW_1$) 24 and 25 and maintenance signal distributors ($MSD_0$ and $MSD_1$) 26 and 27 of a duplicated redundant structure. Although not shown in the drawings, the $TDNW_0$ 24 and the TDNW$_1$ 25 respectively include a time division switch, a multiplexer, and a demultiplexer. The HDTIM3 includes duplicated host digital trunk interface controllers (HDTIC$_0$ and HDTIC$_1$) 30 and 31. The HDTIC$_0$ 30 is set in one of active and standby mode while the HDTIC$_1$ 31 is set in the other one of the above two modes which is not occupied by the HDTIC$_0$ 30. The HDTIC$_0$ 30 and the HDTIC$_1$ 31 are connected to the TDNW$_0$ 24 and the TDNW$_1$ 25 via time division multiplexed highways 28 and 29. The HDTIC$_0$ 30 and the HDTIC$_1$ 31 are also connected respectively to the MSD$_0$ 26 and the MSD$_1$ 27 via control lines 33 and 34. The HDTIC$_0$ 30 and the HDTIC$_1$ 31 are coupled to each other via cross-communication lines 35. The HDTIM3 incorporates a plurality of host digital trunk interface circuits (HDTI's) 32a through 32n each of which is connected to the HDTIC$_0$ 30 and the HDTIC$_1$ 31.

A remote office 5 which is connected to the host office 1 via a plurality of digital transmission lines 4a through 4n are installed both in a suburban area and a rural area and comprises respectively a remote local control module (RLOCM) 6 and a line module (LM) 7. The RLOCM6 includes duplicated remote local controllers (RLOC$_0$ and RLOC$_1$) 60 and 61 and a plurality of remote digital trunk interface circuits (RDTI's) 62a through 62n. The RDTI's 62a through 62n are connected to the HDTIs 32a through 32n respectively via the digital transmission lines 4a through 4n as well as to the RLOC$_0$ 60 and the RLOC$_1$ 61. The RLOC$_0$ 60 and the RLOC$_1$ 61 are coupled with cross-communication lines 63. The LM7 comprises digital line circuits (DLCs) 71a through 71x which connect subscribers or subscriber terminal devices (S's) 8a through 8x respectively and have the function of a coder and a decoder, duplicated digital line switches (DLSW$_0$ and DLSW$_1$) 72 and 73 having the function of a concentrator, and duplicated line module controllers (LMCTL$_0$ and LMCTL$_1$) 74 and 75. The pair of DLSW$_0$ 72 and DLSW$_1$ 73, and the pair of RLOC$_0$ 60 and RLOC$_1$ 61 are connected by a plurality of time division multiplexed highways 76a through 76y and 77a through 77y.

The TDNW$_0$ 24 and the TDNW$_1$ 25 of the host office 1 are connected to other remote offices (not shown) via other HDTIMs (not shown). The voice information and control information are transmitted between the host office 1 and the remote office 5 via the digital transmission lines 4a through 4n either at a PCM24 system or a PCM30 system. If the PCM24 system is adopted, the control information is transferred by using the No. 22 channel of the Nos. 0 through 23 channels between the HDTIC$_0$ 30 and the RLOC$_1$ 60 and by using the No. 23 channel between the HDTIC$_1$ 31 and the RLOC$_1$ 61 respectively. If the PCM30 system is adopted, the control information is transferred by using the No. 16 channel of the Nos. 0 through 31 channels between the HDTIC$_0$ 30 and the RLOC$_0$ 60 and by using the No. 31 channel between the HDTIC$_1$ 31 and the RLOC$_1$ 61.

The operation according to the digital switching system will now be described referring to FIGS. 1, 2A and 2B. It is assumed herein that the HDTIC$_0$ 30 and the RLOC$_0$ 60 are designated as active transmission controllers while the HDTIC$_1$ 31 and the HDTIC$_1$ 61 as standby transmission controllers, the HDTIC$_0$ 30 and the HDTIC$_1$ 31 are operating in synchronous mode, and the RLOC$_0$ 60 and the RLOC$_1$ 61 are also operating in the mode. When a subscriber 8a originates a call in order to communicate in voice with a desired subscriber, an originating signal is inputted in the LM7. The active RLOC$_0$ 60 of RLOCM6 receives from the LM7 the originating signal as status information of the subscriber 8a at a cable receiver (CR) 601 via a scan information transmission line. The status information is inputted in a scan information memory circuit (SCNM) 602 to be compared with the status information of the preceding time on the subscriber 8a. If the comparison reveals any change in the status, accommodation location information and changed status information of the subscriber 8a are inputted from the SCNM 602 to a queue buffer circuit (SCNQ) 603. A microprocessor (MP) 605 periodically reads the content of the SCNM603 via an internal bus 604, and when it recognizes the subscriber 8a has originated the call based on the read status information, informs the host office 1 by inputting the first control information including the accommodation location information and the originating status information of the subscriber 8a at a high level data link control processor (HDLCP) 606 via the internal bus 604. The HDLCP606 inputs the first control information in a multiplexer (MUX) 607 in accordance with an HDLC protocol. The first control information is converted from serial form to parallel form by a shifter (SFT) 608 of the second input port of the MUX607, inputted at a time division switch (SW) 611 via a buffer (BF) 609 and a selector (SEL) 610, and multiplexed over the voice information which is being communicated under the control of a control memory circuit (CNTM) 612. The first control information which has been converted from parallel form to serial form via a buffer (BF) 613 and a shifter (SFT) 614 which form one of plural first output ports is inputted at the RDTI62a via a gate circuit (GT) 615. The gate on the GT615 is kept open by a signal from a gate control interface circuit (GTCNT) 636.

The standby RLOC$_1$ 61 which operates in a mode synchronous to the RLOC$_0$ 60 receives at a CR658 the originating signal from the LM7 simultaneously as a status information of the subscriber 8a via a scan information transmission line. The status information is inputted at a SCNM659 to be compared with the status information of the preceding time on the subscriber 8a. If the result of the comparison reveals a change in status, the accommodation location information and the changed status information of the subscriber 8a are fed from the SCNM659 to a SCNQ660. An MP655 periodically reads the content of the SCNQ660 via a internal bus 654 and when it recognizes the call is originated by the subscriber 8a based on the read status information, informs the host office 1 by supplying the first control information including the accommodation location information and the originating status information of the subscriber 8a to a HDLCP653 via the internal bus 654. The HDLCP653 inputs the first control information in a MUX661 in accordance with an HDLC protocol. The first control information is processed by an MUX661 in a manner similar to the MUX607, but as a GT662 is closed with a signal from a GTCNT 663, the information is not sent out from the GT662 to the RDTI62a. The HDLCP653 inputs the first control information at a CR633 of the RLOC$_0$ 60 via a CD664 and a cross-communication line 63 in accordance with the HDLC protocol. The first control information which has been inputted at the MUX607 from the CR633 is passed through an SFT634 and a BF635 which form the third input port toward the TSW611 and then inputted at the RDTI62a via the TSW611, the BF613, the SFT614, and the GT615.

The voice information from the RDTI62a and the first control information sent from the HDLCP606 are received by the HDTI32a of the HDTIM3 via the digital transmission line 4a and transferred to a multiplexer (MUX) 301 of the $HDTIC_0$ 30. The voice information is sent out from a cable driver (CD) 308 to the time division multiplexed highway 28 via a shifter (SFT) 302, a buffer (BF) 303, a selector (SEL) 304, a time division switch (TSW) 305, a BF306 and an SFT307 of an MUX301, and then transmitted to the other party subscriber via the duplicated $TDNW_0$ 24 and $TDNW_1$ 25 of the SWPS2. The first control information is inputted from a selector (SEL) 311 to an HDLCP312 via the SFT302, the BF303, the SEL304, the TSW305, a BF309 and an SFT310 of the MUX301. The HDLCP312 transfers the first control information to a microprocessor (MP) 314 via an internal bus 313. When the MP314 recognizes the first control information is to be sent to its upper device or SWPS2, it inputs the information in the HDLCP312. The HDLCP312 inputs the first control information at a scan memory circuit (SCNM) 315 and an inserter (INST) 316 in accordance with an HDLC protocol. The first control information from the INST316 is inputted at a CD308 via an SFT317, a BF318, the SEL304, the TSW305, the BF306 and the SFT307 of the MUX301. The first control information which has been inputted at the duplicated $TDNW_0$ 24 and $TDNW_1$ 25 from the CD308 via the highway 28 is received by the $SPC_0$ 22 and transferred to the $CP_0$ 20 via the processor bus. The $CP_0$ 20 analyses the first control information, and when it recognizes a call originating from the subscriber 8a, starts the control in order to send out a dial tone to the subscriber 8a and receive the subscriber number of the other party subscriber. The $CP_0$ 20 gives an order to the $SPC_0$ 22 via the processor bus for sending out the dial tone to the subscriber 8a and receiving the subscriber number of the other party which is to be sent out from the subscriber 8a. When receiving this order the $SPC_0$ 22 connects the $TDNW_0$ 24 to a service trunk module (not shown) which is accommodated in the $TDNW_0$ 24 and has the functions to send out the dial tone and to receive the subscriber number. The dial tone sent out from the service trunk module and the second control information on the subscriber number receiving order from the $SPC_0$ 22 are sent out from the $TDNW_0$ 24 to the highway 28 as well as from the $TDNW_1$ 25 to the highway 29.

The voice information from the RDTI 62a which is received by the HDTI32a of the HDTIM3 and the first control information which is sent out from the HDLCP653 are transferred to an MUX355 of the $HDTIC_1$ 31. The voice information is processed by the MUX355 similarly to the case of the MUX301, sent out from a CD356 to the time division multiplexed highway 29 and then transferred to the other party subscriber via the $TDNW_1$ 25 and the $TDNW_0$ 24 of the SWPS2. The first control information is inputted at the MUX355, but as an SEL357 has been prepared to receive the control information from a CR365, it cannot be inputted at an HDLCP353. The HDLCP353 receives the first control information from a BF343, an SFT344 and a CD345 of the $HDTIC_0$ 30 via the corsscommunication line 35. The HDLCP353 transfers thus received information to an MP359. When the MP359 recognizes the received control information is to be sent out to the SWPS2 which is higher order device thereto, the MP359 inputs it at the HDLCP353. The HDLCP353 inputs the first control information at an SCNM360 and an INST361 in accordance with an HDLC protocol. The first control information from the INST361 passed through the MUX355 and inputted at a DC356. The first control information inputted from the CD356 to the $TDNW_0$ 24 and the $TDNW_1$ 25 of the SWPS2 via the highway 29 is transferred to the $CP_1$ 21 after it is received at the $SPC_1$ 23.

The $HDTIC_0$ 30 and the $HDTIC_1$ 31 of the host office 1 respectively receives the second control information and the voice information which are inputted from the SWPS2 via the time division multiplexed highways 28 and 29 for synchronous operation. The $HDTIC_0$ 30 which has been designated as active mode by the $MSD_0$ 26 of the SWPS2 via the control line 33 takes the second control and voice information in a demultiplexer (DMUX) 320 via a CR319. The voice information is converted from serial form to parallel form by an SFT322 and a BF323 which form the first input port, and inputted at the TSW321 via the SEL324. A control memory circuit (CNTM) 325 controls the TSW321 to cause the voice information to be inputted at a BF326 and an SFT327 of one of the plural first output ports. The voice information thus converted from parallel form to serial form by the BF326 and the SFT327 is inputted to the HDTI 32a via a gate circuit (GT) 330 and then transferred to the transmission line 4a. On the other hand, the second control information is converted from serial form to parallel form by the SFT322 and the BF323 of the first input port, and inputted at the TSW321 via the SEL324. The CNTM325 controls the TSW321 to cause the second control information to be inputted at a BF331 and an SFT332 of the second output port. The second control information converted by the BF331 and the SFT332 is inputted at a dropper queue circuit (DRPQ) 333. The second control information in the DRPQ333 is read by the MP314 via the internal bus 313. When the MP314 recognizes the second control information is for the remote office 5, it sends out the second control information to the HDLCP312 via the internal bus 313. The HDLCP312 transfers the second control information to the DMUX320 in accordance with the HDLC protocol. The control information is sent out by a CD339 and inputted at a DMUX351 via a CR362 of the $HDTIC_1$ 31, but is not outputted to the HDTI 32a as a GT352 is closed. The second control information inputted at the DMUX320 is converted from serial form to parallel form at an SFT334 and a BF335 of the second input port, and inputted to the TSW321 via the SEL324. The CNTM325 controls the TSW321 to input the second control information at the BF326 and the SFT327 of one of the first output ports. The second control information thus converted by the BF326 amd the SFT327 are inputted via the GT330 at the HDTI 32a and then transmitted to the transmission line 4a.

The $HDTIC_1$ 31 which has been designated as standby mode by the $MSD_1$ 27 of the SWPS2 via the control line 34 receives at a CR350 the information identical to the second control and voice information received by the $HDTIC_0$ 30 and performs the same operation as the $HDTIC_0$ 30. However, the $HDTIC_1$ 31 which has been designated as standby mode is prohibited by the GT352 to connect the DMUX351 with the HDTIs 32a through 32n, it cannot send out the second control and voice information directly to any of the HDTIs. Accordingly, the $HDTIC_1$ 31 sends out the second control information from the HDLCP353 to the $HDTIC_0$ 30 via a CD354 and the cross-communication line 35. In the $HDTIC_0$ 30, the second control information from the $HDTIC_1$ 31 is inputted at the DMUX320 via the CR336. The control information is converted from serial form to parallel form by the SFT337 and the BF338 which form the third input port for the TSW321, and inputted at the TSW321 via the SEL324. The CNTM325 controls the TSW321 to make the second control information inputted at the BF326 and the SFT327 of one of the plural first output ports. The second control information which is converted by the BF326 and the SFT327 is inputted at the HDTI $32a$ via the GT330 to be transmitted to the transmission line $4a$.

The voice information and second control information transmitted from the HDTI $32a$ of the HDTIM3 to the transmission line $4a$ is received by the RDTI $62a$ of the RLOCM 6, and respectively inputted to both the DMUX616 of the $RLOC_0$ 60 which is operating in active mode and to the DMUX650 of the $RLOC_1$ 61 which is operating in standby mode. The voice and second control information inputted at the DMUX616 in time series within the $RLOC_0$ 60 is converted from serial form to parallel form by an SFT618 and a BF619 of one of the plural SFTs 618 and BFs 619 which form the plural first input ports, and inputted at a TSW617 via an SEL622. The voice information outputted from the TSW617 which is under the control of a CNTM637 is converted from parallel form to serial form by a BF622 and an SFT623 which form one of the plural first output ports, and is transmitted to a highway via a CD624. Out of the second control information outputted from the TSW617, the control information sent out from the HDLCP312 of the $HDTIC_0$ 30 which is in active mode is converted from parallel form to serial form by a BF625 and an SFT626 of the second output port, and communicated to the HDLCP606 via a selector (SEL) 627. When the MP605 receives the second control information from the HDLCP606 via the internal bus 604 and recognizes it as the one for the LM7, the MP605 transmits the second control information from a CD629 via a line module interface circuit (LMINF) 628. Out of the second control information outputted from the TSW617 of the DMUX616, the second control information which is transmitted from the HDLCP353 of the $HDTIC_1$ 31 in standby mode via the DMUX320 of the $HDTIC_0$ 30 in active mode is converted from parallel form to serial form by a BF630 and an SFT631 which form the third output port of the TSW617, and transferred from a CD632 to a CR651 of the RLOC 61 via a cross-communication line 63 of the $RLOC_0$ 60 and the $RLOC_1$ 61. The second control information received by a CR651 is inputted at the HDLCP653 via the SEL652. The MP655 which received the second control information from the HDLCP653 via the internal bus 654 transmits the second control information from a CD657 via an LMINF656 when it recognizes the information is for the LM7.

The voice and second control information transmitted from the $RLOC_0$ 60 via a highway is inputted at the $DLSW_0$ 72 of the LM7. The voice information is transferred to the subscriber $8x$ via the DLC $71x$. The control information is extracted by the $DLSW0_0$ 72 and inputted at the $LMCTL_0$ 74. From this time on, the $LMCTL_0$ 74 keeps operation for transferring to the SWPS2 the subscriber number of the opposite party sent out from the subscriber $8a$ who received the dial tone.

The operation of the digital switching system at one embodiment of the invention has been described above by taking an example of a dial tone connection. In the process of transmission/receiving of control information between the duplicated $HDTIC_0$ 30 and $HDTIC_1$ 31 of the host office 1 and the duplicated $RLOC_0$ 60 and $RLOC_1$ 61 of the remote office 5, if a fault occurs at one of the $HDTIC_0$ 30 and the $RLOC_0$ 60 operating in active mode, and the fault is detected by the SWPS2, the mode is switched between active and standby. The $CP_0$ 20 of the SWPS2 controls the $MSD_0$ 26 and the $MSD_1$ 27 so as to respectively switch the $HDTIC_0$ 30 and the $RLOC_0$ 60 which are currently in active mode into standby mode, and the $HDTIC_1$ 31 and the $RLOC_1$ 61 which are currently in standby mode into active mode. A standby designation signal from the $MSD_0$ 26 for switching the mode from active to standby is received by a CR340 of the $HDTIC_0$ 30 via the control line 33, and inputted at the SEL311, the GT330 and a switching designation signal receiving circuit (TRS) 341. As a result, the MP314 recognizes that the $HDTIC_0$ 30 is designated to be standby mode. The SEL311 is switched so as to be able to receive the control information inputted from a CR342 by the HDLCP312, and the GT330 prohibits the connection between the DMUX320 and the HDTI's $32a$ through $32n$. An active designation signal from the $MSD_1$ 27 is received by a CR363 of the $HDTIC_1$ 31 via the control line 34, and inputted at the SEL357, the GT352 and a TRS364. As a result, the MP359 recognizes that the $HDTIC_1$ 31 is designated to be active mode. The SEL357 is switched to enable receiving the control information inputted from the MUX355 at the HDLCP353, and the GT352 opens the gate to connect the DMUX351 with the HDTIs $32a$ through $32n$. At the $HDTIC_1$ 31 which has been switched to active mode, as the HDLCP 353 transmits and receives the control information with the $RLOC_1$ in accordance with the HDLC protocol independently from the HDLCP312 while the $HDTIC_1$ 31 operates in standby mode. Therefore, even if the $HDTIC_0$ 30 was faulty, operation can securely be continued with a high reliability after switching.

Highly reliable operation at the HDLCP653 in the $RLOC_1$ 61 which has been switched to active mode is similarly secured. The MP605 in the $RLOC_0$ 60 which has been designated to be switched into standby mode controls the GTCNT636 so as to close the gates of the GT615 and switches the SEL627 so that the control information inputted at a CR638 can be received by the HDLCP606. The MP655 in the $RLOC_1$ 61 which has been designated to be switched into active mode controls the GTCNT663 so as to open the gates of the GT662, and switches the SEL652 so that the control information from the DMUX650 can be received by the HDLCP653. The switching designation signal sent to the $RLOC_0$ 60 and the $RLOC_1$ 61 is transmitted from the $HDTIC_1$ 31 which has been switched into active mode via the digital transmission line. From this time on, the $HDTIC_1$ 31 and the $RLOC_1$ 61 in active mode and the $HDTIC_0$ 30 and the $RLOC_0$ 60 in standby mode continue the control over various control information and voice information in a manner similar to the above.

Figure 2A:
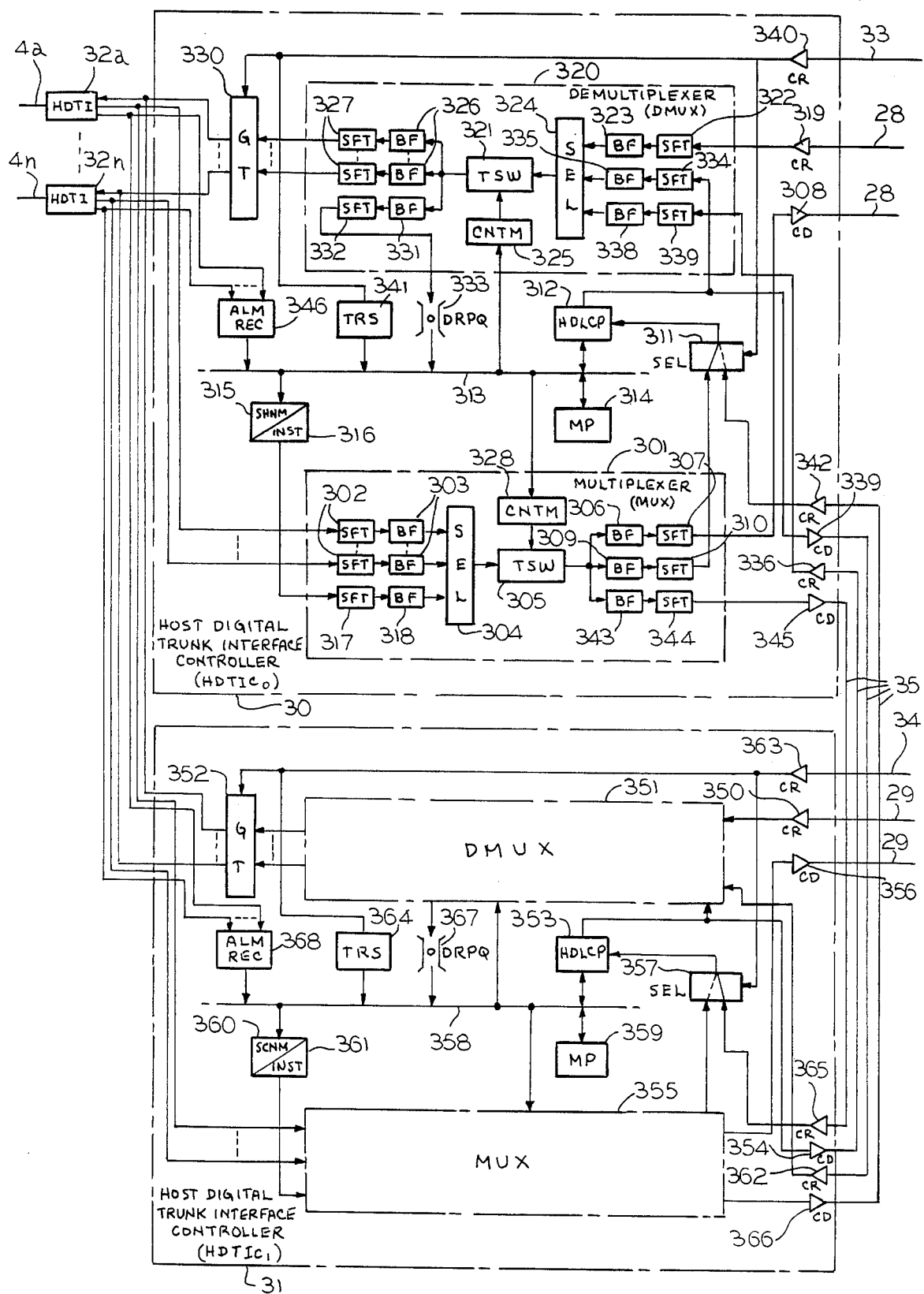
FIG. 2A illustrates detailed structures of the host digital trunk interface controllers shown in FIG. 1.
Figure 2B:
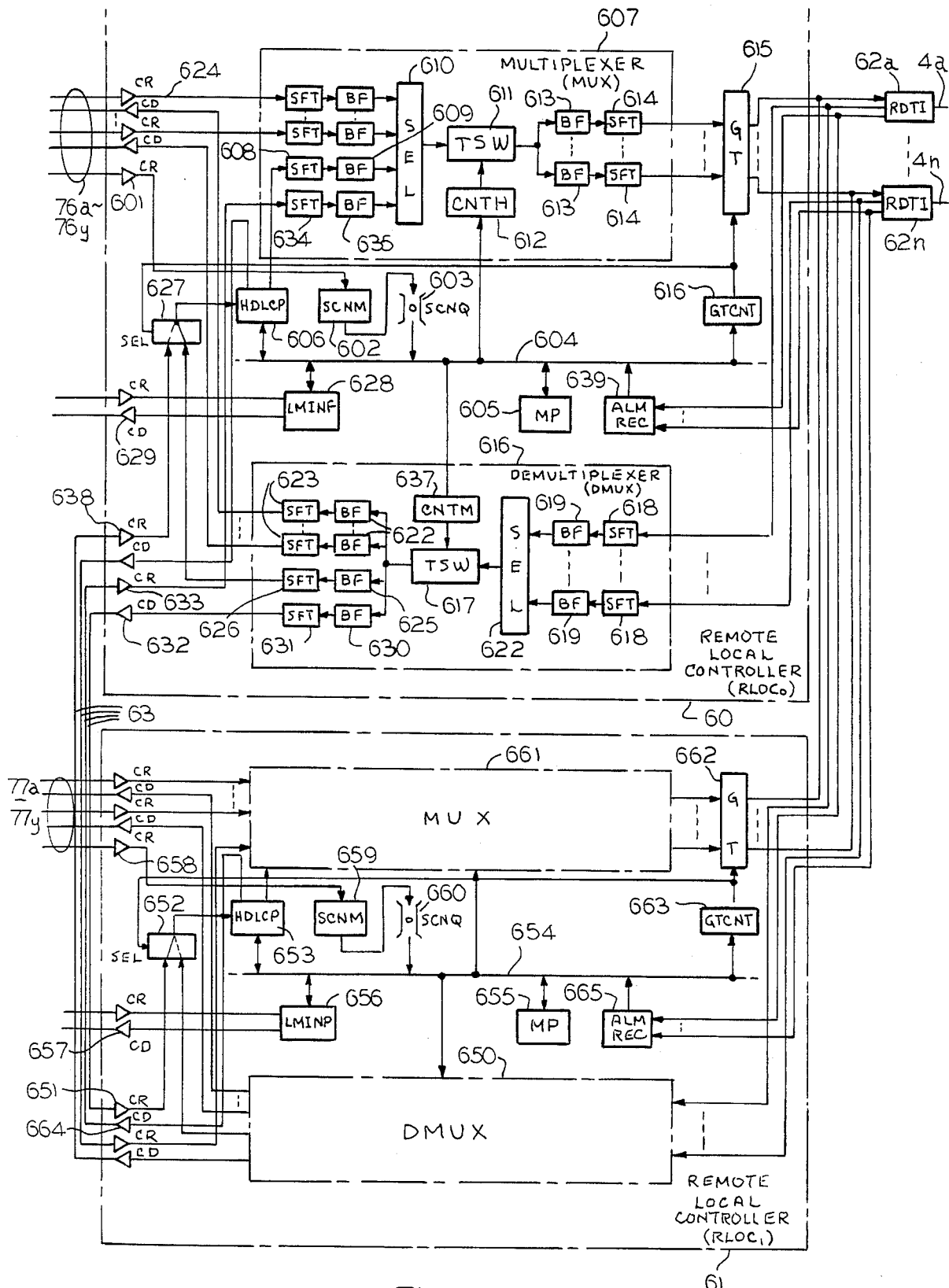
FIG. 2B illustrates detailed structures of the remote local controllers shown in FIG. 1.

In FIGS. 2A and 2B, the reference numerals 346, 368, 639, and 665 denote DTI alarm receivers (ALMREC's). The ALMREC's 346, 368, 639, and 665 receive alarm signals and inform the alarm signals to the MP's 314, 359, 605 and 655 respectively when faults occurred at the digital transmission lines 4a through 4n are detected by the HDTI's 32a through 32n and the RDTI's 62a through 62n. By this manipulation, a suitable digital transmission line is selected in a predetermined priority.

Other alternatives and modifications to the above-mentioned embodiment can be made within the scope of the invention defined by the appended claims.

What is claimed is:

1. A digital switching system with host and remote duplicated transmission controllers, comprising:
    a host office having duplicated first and second transmission controllers, each of said first and second transmission controllers being in one of active and standby operation modes alternatively; and
    a remote office having duplicated third and fourth transmission controllers which are connected with said first and second transmission controllers via at least two of time division multiplexed digital transmission lines, each of said third and fourth transmission controllers being in one of active and standby operation modes alternatively;
    wherein said first transmission controller and said second transmission controller are connected with cross-communication lines to transmit/receive control information, said third transmission controller and said fourth transmission controller are connected with cross-communication lines to transmit/receive control information, said first and third transmission controllers and said second and fourth transmission controllers transmit/receive said control information in accordance with respective high level data link control protocols via different channels of one of said transmission lines, and said controllers which are currently in active operation mode supply respectively their own time division multiplexed paths to said controllers which are currently in standby operation mode.

* * * * *